(No Model.) 6 Sheets—Sheet 2.

L. H. COLBURN.
MACHINE FOR CUTTING SLOTS.

No. 599,054. Patented Feb. 15, 1898.

WITNESSES.

INVENTOR.
Leslie H. Colburn (No Model.) 6 Sheets—Sheet 4.
L. H. COLBURN.
MACHINE FOR CUTTING SLOTS.

No. 599,054. Patented Feb. 15, 1898.

WITNESSES. INVENTOR.

(No Model.) 6 Sheets—Sheet 5.

L. H. COLBURN.
MACHINE FOR CUTTING SLOTS.

No. 599,054. Patented Feb. 15, 1898.

WITNESSES.

INVENTOR.
Leslie H. Colburn.

(No Model.) 6 Sheets—Sheet 6.
L. H. COLBURN.
MACHINE FOR CUTTING SLOTS.

No. 599,054. Patented Feb. 15, 1898.

Fig. 35.

WITNESSES.
C. W. Foureaux
Henry A. Tiffany

INVENTOR.
Leslie H. Colburn.

UNITED STATES PATENT OFFICE.

LESLIE H. COLBURN, OF TOLEDO, OHIO.

MACHINE FOR CUTTING SLOTS.

SPECIFICATION forming part of Letters Patent No. 599,054, dated February 15, 1898.

Application filed December 7, 1894. Serial No. 531,099. (No model.)

*To all whom it may concern:*

Be it known that I, LESLIE H. COLBURN, a citizen of the United States, residing at Toledo, in the county of Lucas and State of Ohio, have invented certain new and useful Improvements in Machines for Cutting Slots; and I do hereby declare the following to be a full, clear, and exact description of the invention, such as will enable others skilled in the art to which it appertains to make and use the same.

My invention relates to an improved machine for cutting slots of various shapes and sizes, principally in articles where the cut must be made internally—such as cutting keyways in pulley-hubs, forming the teeth of internal gears, and performing other analogous operations—and is especially designed as an improvement upon a "slotting-machine" for which United States Letters Patent were granted to me June 28, 1892, and numbered 477,737.

The present invention has for its objects, first, a novel arrangement and construction of the lower guide-bar; second, an improved construction of the upper arm for supporting the cutter-bar; third, an improved method of supporting the back of the cutter-bar and cutter, the table being in any desired angular position and the said support being accurately maintained adjacent to the top surface of the table automatically; fourth, to provide means for accurately centering the work upon the table; fifth, to provide, in combination with other features, mechanism for moving the work to be operated upon in a lateral, transverse, and circular direction; sixth, to provide means for securing an angular adjusting-table in a fixed position with respect to the cutter-bar. I attain these objects by the mechanism illustrated in the accompanying drawings, in which—

Fig. 6 is a front view of the table. Fig. 9½ represents sectional views of the lower part of the cutter-bar. Fig. 11 is a view of the centering device attached to the table. Figs. 12, 13, 14, 14½, and 15½ represent bushings to be used in connection with plate for cutting articles to be operated upon. Fig. 15 is a top and cross sectional view of the said centering-plate. Fig. 16 illustrates the manner of securing the cutter to the cutter-bar and of fastening the upper guide-bar to the said cutter-bar. Fig. 18 is a side elevation of the entire machine, showing same provided with an auxiliary table adapted to be moved longitudinally, transversely, and circumferentially about the cutter-bar. Fig. 19 is a front elevation of the mechanism aforesaid shown in Fig. 18. Fig. 20 is a plan of the table, showing its adjustments. Fig. 21 is a sectional view of the top table. Fig. 22 is a plan of a circular plate adapted to fit into a recess in table shown in Fig. 21. Fig. 23 is a top view of the slide, apron $u$, and bearing $u'$ shown in Fig. 18.

Similar letters and figures refer to similar parts throughout the several views.

Figures 1, 2, 3, 9, 10:
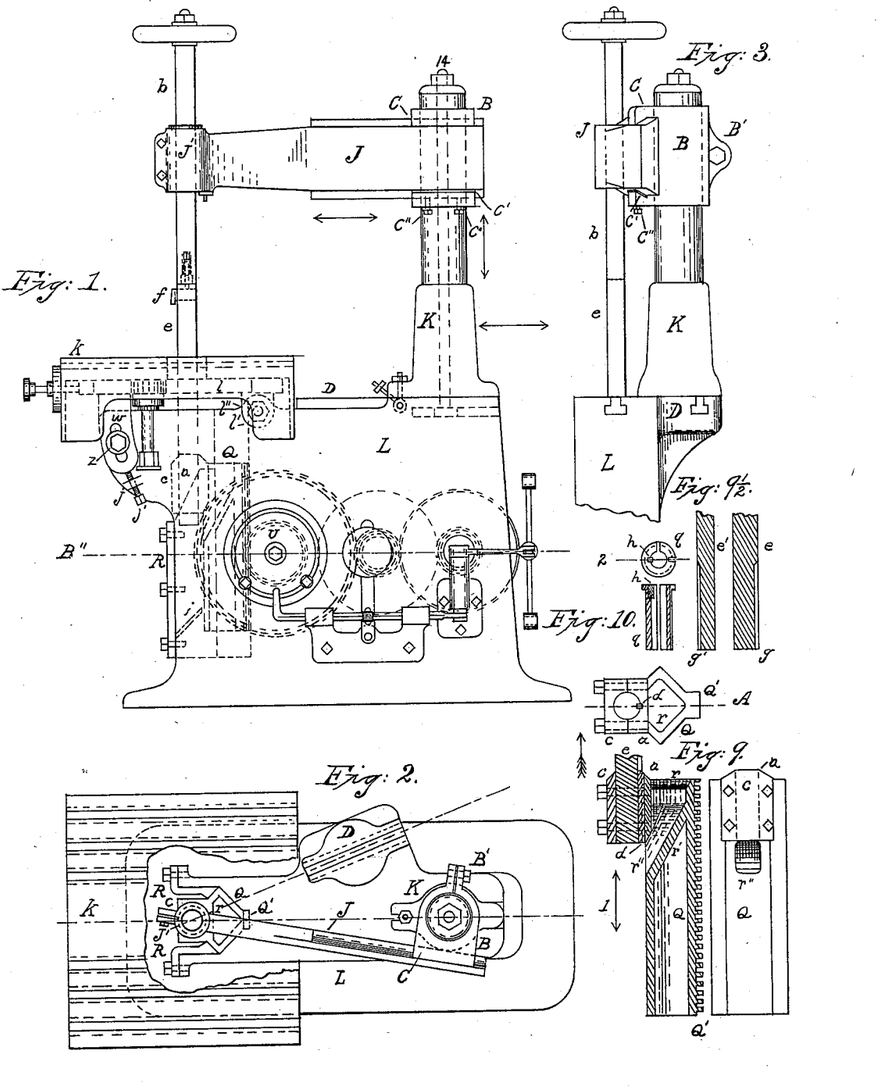
Figure 1 is a side elevation of the entire machine.
Fig. 2 is a plan of the machine, showing the adjustment of the upper arm.
Fig. 3 is an elevation of the upper part of the rear of the machine.
Fig. 9 shows a sectional view on line A, Fig. 7, and front and top view of lower guide-bar.
Fig. 10 represents a sectional view on line 2 in Fig. 10 (plan view) and a plan of the bushing for holding a small-sized tool-bar.
Figure 7:
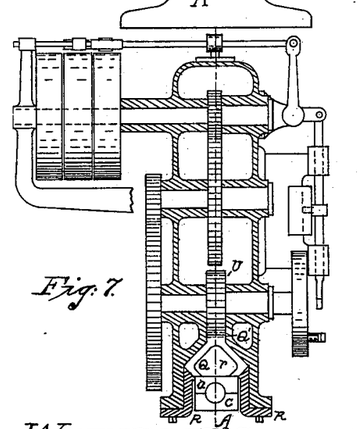
Fig. 7 is a section of the frame on line B'', Fig. 1, showing the manner of gearing same and the operation of the reversing mechanism.
Figure 8:
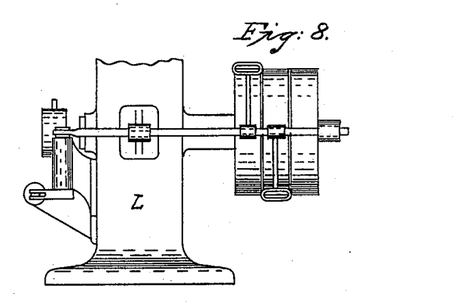
Fig. 8 is a partial rear view of the frame, showing the reversing mechanism.

The framework of the machine consists of the standard L, column K, and arm J. A lower guide-bar Q is fitted to a bearing in front of the machine and has a vertical reciprocating movement, being actuated by a train of gearing, the bar Q having on its rear surface a vertical rack Q', which engages with a pinion U. The lower guide-bar is preferably made V-shaped, as shown in Figs. 2, 7, and 9, the wear being readily taken up by tightening the screws on the caps R R. The lower guide-bar is provided with a projection or head $a$, to which is fitted a cap $c$. This head, together with the cap, is bored in line with the center of the V-shaped bearing to fit the cutter-bar $e$. A feather or key $d$ is fastened into the opening thus bored, which is placed in the center, as shown in two views in Fig. 9. A slot $g$ is cut lengthwise of the cutter-bar $e$, as shown in Fig. $9\frac{1}{2}$. The said cutter-bar being inserted into the head $a$ is held by means of the feather $d$ engaging and fitting into the slot $g$, and is secured in a firm and rigid manner against independent vertical movement and torsion. This insures the accurate setting and holding of the cutter $f$, the shank of which is fitted to a slot in the bar $e$, the said slot being in line lengthwise with the center of the guide-bar and its bearings. It will thus be always in correct central position and alinement.

When the cutter-bar is in position, the cap $c$ is tightened upon it, holding it securely while in the act of taking a downward cut.

By reason of the head $a$ extending outward, so that its bore is outside of the front face of Q, the cutter-bar is adapted to be adjusted vertically in its bearing, as shown by the double-headed arrow 1. This is a convenient arrangement when operating upon articles of different lengths, as the cutter-bar can be adjusted accordingly.

Where a cutter-bar of smaller diameter is used, a bushing $q$ is employed to adapt the said cutter-bar to the bore of the guide-bar Q. The said bushing is adapted to fit into the head $a$ in the same manner as the large cutter-bar $e$, it being slotted on its outside surface to fit the feather or key $d$. It has on its inside a key or feather $h$, which fits into a slot $g$ in the small cutter-bar $e'$, thus centering it in practically the same manner as the large bar. The bushing being split on one side when the cap $c$ is clamped against it will yield to fit and thus securely hold the bar $e'$ within the head $a$ of bar Q. The construction of the lower guide-bar is such that loose chips falling downward from the cutter $f$ will fall in such a manner as to be entirely free from the bearing-surfaces of said guide-bar. The head $a$, Fig. 9, projecting out beyond the said guide-bar bearings and being tapered at its upper extremity adjacent to its connections with the cutter-bar $e$, the chips from the cutter above falling against said tapered surfaces are directed away from said head, and continuing downward such as contact with transverse inclined plate $i$ will be directed away from the contacting surfaces of the said guide-bar with the frame. Occasionally a few chips will lodge on the table above and in other places around the opening in same and finally in falling might alight on the top edges of the lower guide-bar and by lying against the bearings would wipe off the oil on same and cause them to be cut, and, moreover, if a quantity of chips accumulated they would fall over into the teeth of the rack and cause serious damage by being forced between its teeth and those of the pinion. All trouble from this source is entirely eliminated by making a passageway for the chips through the said guide-bar. This passage-way is preferably made as shown in Fig. 9, where it extends from the upper extremity of the said guide-bar (in the rear of the cutter-bar) downward and outward through the front of said guide-bar. Any loose chips and dust in falling cannot alight on the top of the bar, but must fall into the opening $r$, and thence downward and through the opening $r''$ in front, where they will take the path of the other chips and fall clear of all working parts of the machine, as before described.

Figures 5, 17:
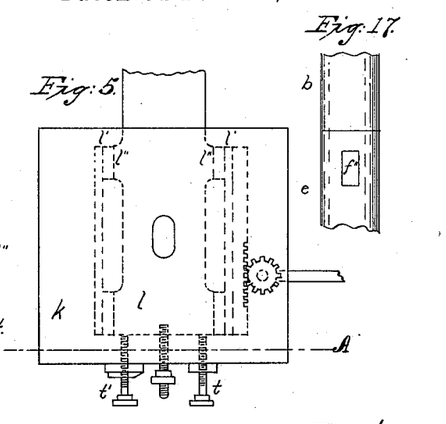
Fig. 5 is a plan of the table.
Fig. 17 is a view of the upper guide-bar and cutter-bar as they appear when fastened together.
Figures 12, 13, 14, 15, 16:
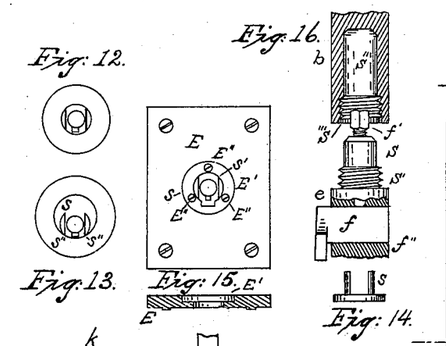

To obtain a true cut and prevent the cutter from springing away from the article operated upon, an upper guide-bar $b$ is used, having a bearing in the arm J and being fitted to the cutter-bar $e$ in the following manner, as illustrated in Figs. 16 and 17: The cutter-bar $e$ is turned down, as shown at $s$, and threaded, as shown at $s'$. The upper guide-bar $b$ is bored out at $s''$, and the turned portion $s$ is fitted accurately to it. It is threaded at $s'''$ and fitted to the threaded portion of the cutter-bar $e$. When clamped together, the bar is very rigid—almost as much so as if it were solid. The cutter is closely fitted to a slot $f''$ near the top of bar $e$, the said slot being cut on a line A drawn through the center of the machine, as shown in Fig. 7. Obviously if a piece of work, such as a pulley with a round hole in hub, were accurately set on the table the cut would be taken squarely in the center of its bore on a line drawn from its circumference cutting its axis. A set-screw $f'$ keeps the cutter from working out of the slot; but the strain of the cut is not intended to come against the set-screw, but rather on the part of the cutter-bar bearing against the shank of the cutter at its upper edge, the cutter-shank being a close fit in slot. The set-screw being in the center of the bar when the guide-bar is screwed down, it presents a smooth surface outside, the joint being scarcely discernible.

In my patent dated June 28, 1892, No. 477,737, a special construction of upper arm was shown. The one illustrated here is a modification of same, having all the adjustments of the former and in addition a longitudinal movement, which will be described.

A column K is fastened to the standard L by a bolt 14, passing through its length, as shown, or by any other convenient means. The split-sleeve B is fitted to the round part of the column and is adapted to be clamped in any position on it by means of the bolt B'.

On its opposite side it is planed to fit the arm J, as shown in Figs. 1, 2, and 3, at C. This bearing is preferably of a dovetail form, having a gib C, which is forced against the arm J by the set-screws C'', thereby rigidly clamping the arm in any desired longitudinal position. The column K has another bearing on the standard L at D, and when articles to be operated upon are of such a diameter that their external or internal surfaces come in contact with the said column K when it is in position, as shown in Figs. 1 and 2, it is adapted to be moved to the bearing D, as shown in Fig. 3, in substantially the same manner and for the same purpose as shown in my former patent. The advantage in this mechanism is that the column K can be adjusted radially with respect to the cutter-bar upon the standard L, and the adjustment of the arm J can be made at its bearing C, thus keeping the bearing J' in line with the cutter-bar. This construction allows a considerable adjustment of the column K, which allows for a greater range of work than where the column K is limited to two fixed positions, as shown in my former patent.

For cutting taper-work the table is adapted to tilt above and below a level plane. The slide $l$, upon which the table rests, has two lugs or ears $l'$, which are pivotally attached to two similar ears $l''$ on the frame L. On either side of the front of slide, on its lower surface, are attached two slotted quadrants $w$ $w$. Two small ears $j$, to which are fitted the set-screws $j'$, project from the standard L.

When it is desired to tilt the table, the clamping-screws $zz$ are loosened and the table inclined upward or downward and fixed against the downward-thrusting movement of the cutter-bar by means of the screws $jj$, disposed to impinge against the lower extremities of the quadrant-arms $w$ $w$ for the purpose of limiting the movement thereof. The clamping-screws $zz$ are then tightened against the quadrants and the table is locked in position. A pointer M', moving over a graduated scale, indicates the amount of taper given the table, as shown in Fig. 18.

Figures 6, 11, 14, 15:
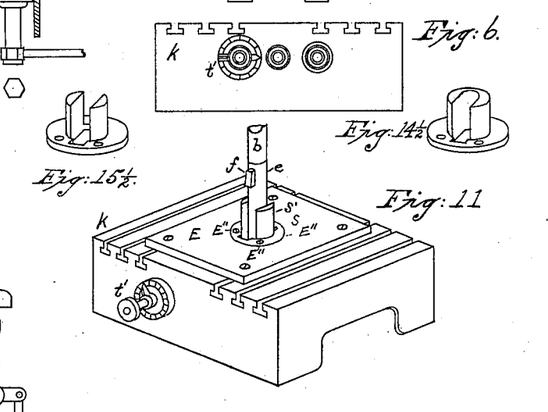

When machine is used for cutting key-seats internally, it is necessary to have some means for accurately centering or chucking articles to be operated upon. With this end in view, the device shown in Figs. 11, 12, 13, 14, and 15 is designed to concentrically adjust, by means of their central bore, articles to be operated upon. A flat plate E, having a circular recess E' in its center, to which is fitted a bushing S, having a turned portion S', which is preferably of the same diameter as the hole in the article to be operated upon, is fitted to the table. The central portion of the bushing is cut out to admit the cutter-bar, as shown in Fig. 11. The article to be operated upon is slipped over the bushing, as shown in Fig. 12, and is thereby centered and set in a certain position on the plate, the latter having been first set on the table so that its recess is concentric with the cutter-bar. A slight pressure with a clamping-bar or other means is all that is necessary to hold the said article while being operated upon.

In Fig. 13 is shown a centering-bushing which can be used to center work having different diameters of bores. This bushing only differs from the other in that its front edges must be on a line at right angles to the line A drawn through the center of the machine, Fig. 7. It is obvious that any piece of work with a true bore can be centered by this bushing by bringing its inner surface in contact with the two points S'' S''.

The advantage of having the sleeve fit snugly into the bore of the work, as shown in Figs. 12 and 15, is that an article which is not faced off on the outside, but merely bored, can be accurately chucked and a key-seat cut exactly in line with the hole.

In cutting key-seats in a large number of pieces of the same kind and dimensions it is always desirable to have the keyways alike, and the centering-plate just described is particularly adapted to accomplish this purpose.

The bushing S being held rigidly in plate E by the screws E'' E'' E'' and the plate in turn held rigidly to table any piece of work placed over the bushing, either fitting it closely or having its inner surface against it, will determine the position of succeeding pieces of the same variety. Thus successive pieces can be operated upon with like results. The table is fitted on its front face with two screws for gaging the depth of the cut in the work, as illustrated and described in my former patent.

When articles to be operated upon are placed on the table, as just described, their relative positions to that of the end of the micrometer depth-screw $t'$ is always the same. If the micrometer-screw $t'$ be set for the desired depth of cut and the pieces be set in the same position each time, as herein described, with the cutter securely clamped in cutter-bar, the keyways in same will all be of the same depth. If the table is tilted, the taper per foot of all key-seats will be same without regard to their length.

Figure 4:
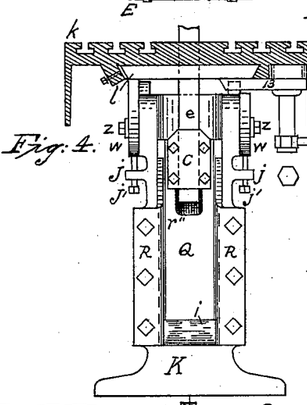
Fig. 4 is a front elevation of the frame and a section of the table on line A, Fig. 5.

For operating upon such work as cutting the teeth of internal gears, removing the metal from any internal work—such as connecting-rod straps, dies, polygonal-shaped holes, &c.—it is necessary to have in addition to a forward-and-back movement of the table a transverse and circular motion. In Figs. 18, 19, 20, 21, 22, and 23 are shown an attachment for accomplishing this end. The slide $l$ is made somewhat longer than in the other form of machine, and the extension 13, Fig. 4, for supporting the pinion-stud is done away with. To the slide is fitted the table or apron $u$, having at its upper part a bearing $u'$, to which is fitted another table or apron $v$, having at its upper part a circular recess $v'$, to which is fitted the preferably circular table $x$, being held solidly to the table $v$ by means of the four flanged corner projections $v'''$. The table $u$ has a lateral motion given to it by means of a feed-screw $u''$. A transverse motion is given the table $v$ by means of the feed-screw $v'''$. A rotary motion is given the table $x$ by means of the shaft $x'$, carrying the worm $x''$, which drives the worm-gear on the lower part of the table $x$, as shown in Figs. 18, 20, and 21. The feeding-screws are all shown as being adapted to be operated by hand, but it is evident that power feed mechanism can be attached to any of them. The table $x$ has a circular recessed opening in the center, as shown at $y$, to which are fitted plates having various-sized openings, such as $y'$. These plates are adapted to be fastened to the recess in the table by means of countersunk headed screws or other suitable means.

The horizontally-adjustable table combination herein described is not claimed as new, except in combination with a tilting table mechanism illustrated and a divided cutter-bar operating about said chuck or through its central bore and having top and bottom supports, by which construction the said mechanism is adapted to perform a large variety of special work—such as outline, cam-cutting, &c.—hitherto impracticable.

Figure 24:
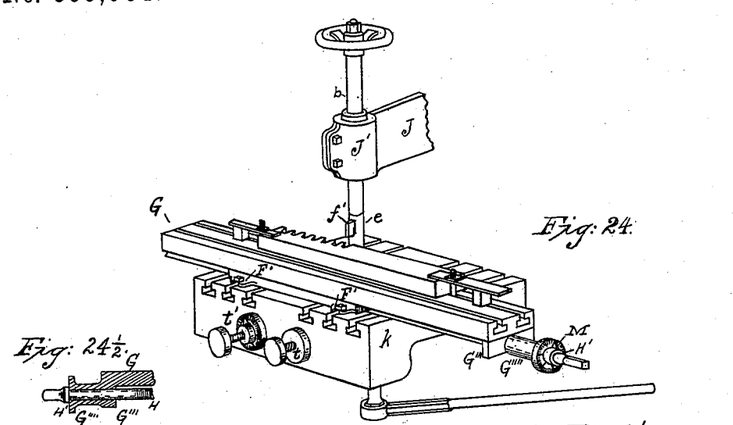
Figs. 24, 24½, 25, and 26 are views of an attachment for cutting-racks.
Figure 25:
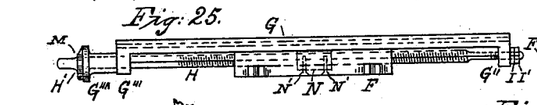
Figure 26:
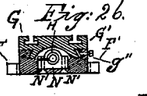

Two attachments are illustrated, one in Figs. 24, 24½, 25, and 26 for cutting the teeth of racks or ratchets. Another, Figs. 27, 28, 29, 30, 31, and 32, shows an upright chuck, which is adapted to hold small articles to be planed, such as gibs, keys, and other small work. Referring to Fig. 24, the view here shows the rack-cutting attachment as it stands on the machine, with a partly-cut rack in position. In Figs. 24, 24½, 25, and 26 is shown a bed-plate F, which is fastened to the top of the table $k$ by means of slotted lugs or ears F'. (See Fig. 24.) To this plate is fitted a long narrow table G, having a take-up gib G' and screws $g''$ for adjusting same. The table G has two lower projections G'' and G''', which can be made integral with or separate from the table G. These projections are bored and serve as journal-bearings for the lead-screw H. Near the extremity H' of the said screw H is an enlargement forming a shoulder. An extension G'''' of the lug G''' extends outward against the shoulder H' of the screw H. The opposite end of the screw-shaft H is reduced in size and fitted to the bore of the lug G''. By means of a nut I and jam-nut I' all end motion of the said shaft is avoided. The outer face of the projection G'''' of the lug G''' is enlarged, forming a dial-plate which is graduated into any number of units. A pointer M, adapted to clamp on the enlarged portion of the screw-shaft H', serves to indicate the extent of movement of the nut N, which is firmly attached to the table G. The nut N is preferably made in one piece and split on one side, as shown in Fig. 26, by which means it is adapted to be adjustably secured by the screws N' N'.

It will be seen that a piece of material upon which it is desired to cut any number of teeth equidistant from each other having been clamped firmly to the table G can be graduated transversely in either direction in front of the cutter $f'$, said cutter being adapted in form to cut the desired teeth. The distance between the centers of the teeth being known, the correct adjustment can be accurately made by turning the lead-screw H the same distance for each tooth, the amount of rotation being indicated always by the pointer M on the graduated dial G''''. The feed of the cutter and the total depth of its cut are regulated by the micrometer-screws $t$ and $t'$, as described, in slotting. The table K being adapted to tilt, such teeth can be cut on a bevel surface.

Figure 27:
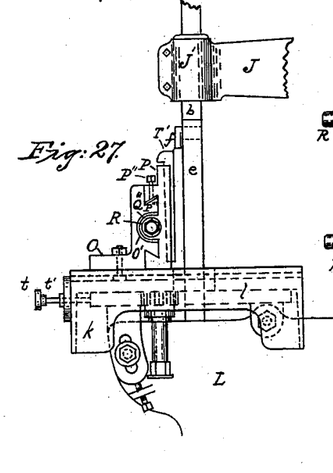
Fig. 27 is a view of an upright chuck for holding small articles to be operated upon.
Figure 28:
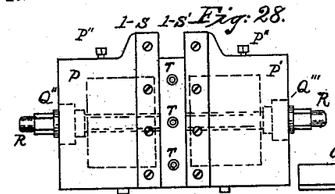
Figs. 28, 29, 30, 31, and 32 are detail views of the same.
Figure 29:
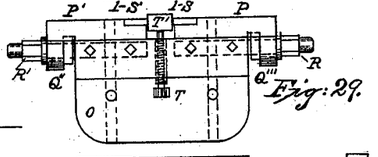
Figure 30:
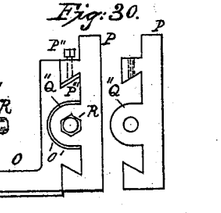
Figure 31:
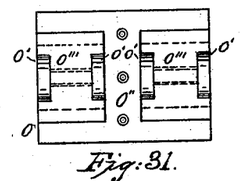
Figure 32:
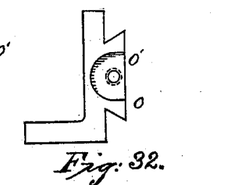

In Fig. 27 is shown an elevation of the aforesaid upright chuck in position on the table. Fig. 28 is a front view, Fig. 29 a plan, and Figs. 30, 31, and 32 are details, of same. O is an angle-plate having one side adapted to be clamped on table $k$ by means of bolts. On its perpendicular face is a horizontal dovetailed bearing to which are fitted the jaws P and P', the wear of same on O being taken up by the set-screws P'' impinging against the gib P'''. At the outer extremities of the jaws P and P' are lugs or ears Q'' and Q''', to which are fitted the two screws R and R'. The dovetail bearing on plate O is divided in the center by the space O'', making a separate bearing for each of the jaws P and P'. Four recesses O' O' O' O' reduce the center of the dovetail bearings, leaving solid portions O''' O''' in each, which are threaded to receive the screws R and R'. The screws R and R' have polygonal-shaped heads, which adapt them to be turned by a suitable wrench, thus opening or closing the space between the jaws. Hardened-steel pieces $l\ s$ and $l\ s'$ are inserted and held by means of flat-headed screws at the front edges of the jaws P and P' for the purpose of more accurately holding the work and for durability.

Set-screws T T T are used to adjust the articles to be operated upon in chuck and to hold same from being pushed back when being fed to the cutter.

T' shows a piece of metal clamped between the jaws in position to be operated upon.

The depth and amount of cut is regulated by the micrometer-screws $t$ and $t'$ in the manner hereinbefore described. The table $k$ being adapted to tilt, work can be cut on any desired taper.

Figure 35:
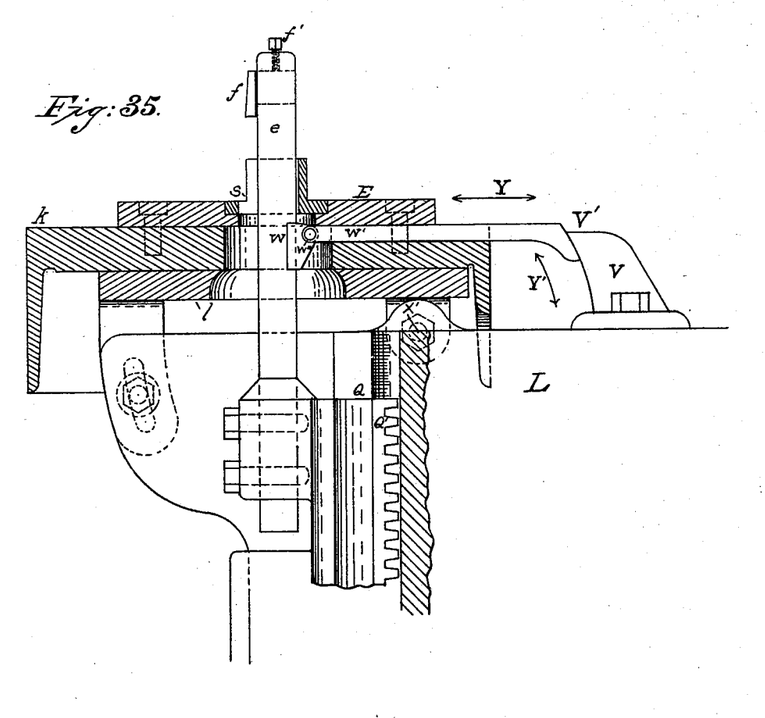
Fig. 35 shows a device for supporting the cutter-bar from the rear, which enables the bar to operate without the upper support, allowing the column, upper arm, and guide-bar to be entirely removed from the machine.

At $w'$, Fig. 35, is a bar fitted within a slot formed just beneath the top surface of the table, the plate E covering its top side and holding it in working position.

Figure 33:
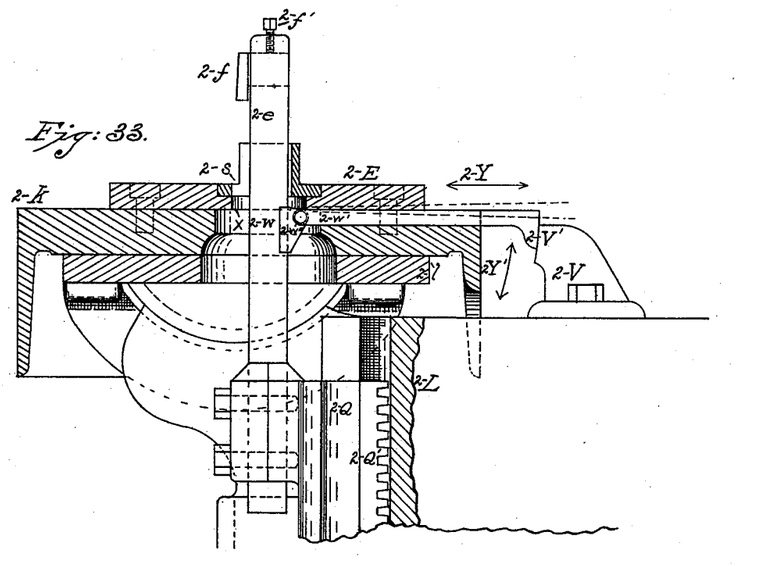
Figs. 33 and 34 illustrate a modification of the principle illustrated in Fig. 35, wherein the supporting-table is pivoted at a different point from that shown in Fig. 35.
Figure 34:
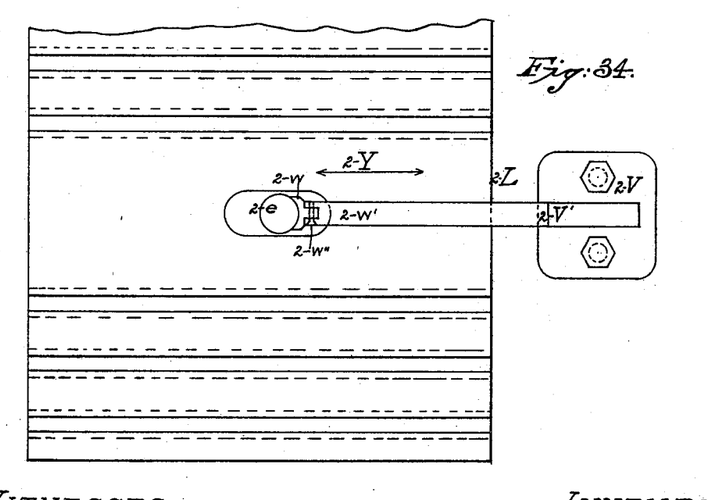

At $w''$ is a pivot and bearing which secures the bearing-shoe to the said bar, admitting of an oscillating motion in said shoe. The outer end of the bar $w'$ at V' is in form of an arc of a circle concentric with the point X', which point also coincides with the center of oscillation of the table, which is also true with respect to the modification shown in Figs. 33 and 34.

V is a rigid bracket adapted to fit the form of the end V' of the said bar w'.

Having described my invention, what I claim as new, and desire to secure by Letters Patent, is—

1. In a slotting-machine a lower guide-bar having a centrally-receiving and forward and outwardly discharging chip passage-way substantially as shown.

2. In a slotting-machine, the cutter-bar $e$, provided with tool-slot $f'''$, tool-securing screw $f'$ and thread $s'$ in combination with guide-bar $b$, having socket $s''$ and thread $s'''$ substantially as shown.

3. In a slotting-machine, the cutter-bar $e$, provided with tool-slot $f'''$, tool-securing screw $f'$, in combination with guide-bar $b$, having socket $s''$ and means for rigidly securing said cutter-bar $e$ within said socket $s''$, substantially as shown.

4. In a slotting-machine, a cutter-bar having the line of its vertical center in a fixed position, a supporting-column having the line of its vertical center adapted to be varied toward and from the said vertical center of the said cutter-bar, in combination with a vertically-adjustable sleeve B having slideways C adapted to fit corresponding ways upon the arm J, substantially as shown.

5. In a slotting-machine bar W', plate E and pivotal shoe W'', in combination with bracket $v$ and its circular arc $v'$, substantially as shown.

In testimony whereof I have affixed my signature in presence of two witnesses.

LESLIE H. COLBURN.

Witnesses:
E. S. GILLETTE,
CANIS K. SOUTHARD.